Oct. 13, 1970  E. L. HOPKINS ET AL  3,533,699
SYSTEM OF ALIGNMENT PARTICULARLY SUITABLE FOR
USE IN AUTOMOTIVE APPLICATIONS
Filed July 23, 1968  4 Sheets-Sheet 1

INVENTORS
EVAN L. HOPKINS
LEE K. IRWIN

BY Burns, Doane, Benedict,
Swecker & Mathis
ATTORNEYS

Oct. 13, 1970    E. L. HOPKINS ET AL    3,533,699
SYSTEM OF ALIGNMENT PARTICULARLY SUITABLE FOR
USE IN AUTOMOTIVE APPLICATIONS
Filed July 23, 1968
4 Sheets-Sheet 3

Oct. 13, 1970  E. L. HOPKINS ET AL  3,533,699
SYSTEM OF ALIGNMENT PARTICULARLY SUITABLE FOR
USE IN AUTOMOTIVE APPLICATIONS
Filed July 23, 1968  4 Sheets-Sheet 4
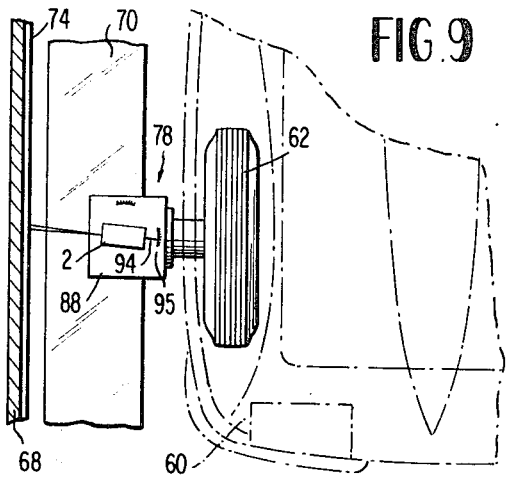
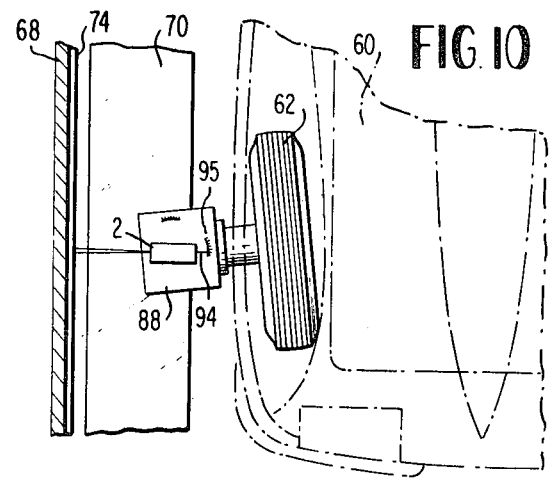
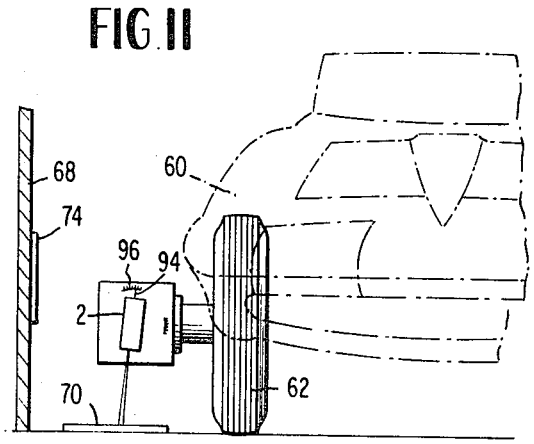
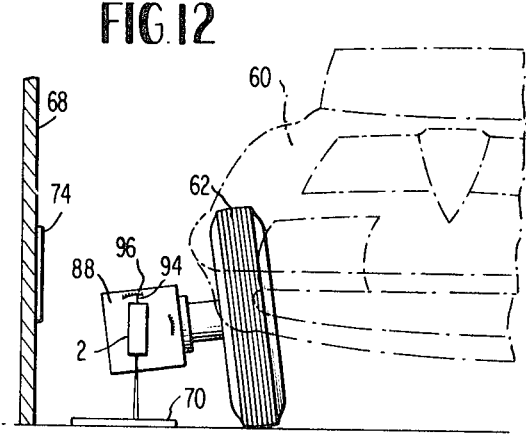
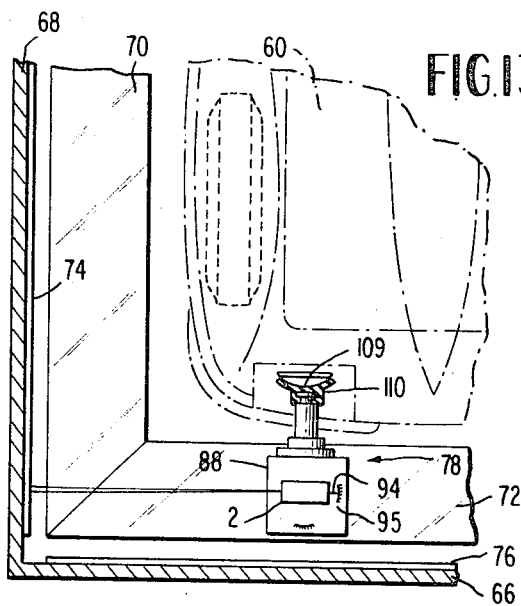
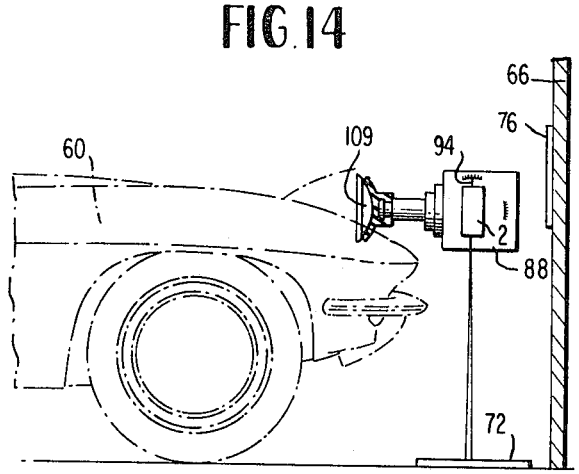

United States Patent Office 3,533,699
Patented Oct. 13, 1970

3,533,699
SYSTEM OF ALIGNMENT PARTICULARLY
SUITABLE FOR USE IN AUTOMOTIVE
APPLICATIONS
Evan L. Hopkins and Lee K. Irwin, Emporia, Kans., assignors to Hopkins Manufacturing Corporation, Emporia, Kans., a corporation of Kansas
Filed July 23, 1968, Ser. No. 746,786
Int. Cl. G01b 11/26, 11/275
U.S. Cl. 356—121                13 Claims

ABSTRACT OF THE DISCLOSURE

A system of alignment which may be utilized for aligning automobile components and for other applications. An alignment device intersected by a first plane of the device may be moved relative to a reflecting surface disposed in a second plane to bring the first and second planes into mutually perpendicular relation. A non-directional source of light on the device disposed in the first plane faces toward the reflecting surface to produce an illuminated target thereon. At least two signal producing light detectors on opposite sides of the first plane connected with the device have lookout paths extending divergingly from the detectors to the reflecting surface. Each detector has a beam of sight within the associated lookout path extending between the detector and the target. Barriers on the device extend oppositely from the first plane to at least partially intersect the beams of sight of the respective detectors to partially obscure them. The barriers are arranged in such mutual relation that the detectors are partially obscured by equal amounts to produce equal signals only when the first plane is precisely perpendicular to the second plane. Inclination from the perpendicular of the device causes the beams to project unequally into their associated beams of sight to cause one of the detectors to become more obscured and the other to become less obscured to cause a signal unbalance.

BACKGROUND OF THE INVENTION

This invention relates to a system of alignment whereby a device intersected by a first plane of the device may be aligned relative to a reflecting surface disposed in a second plane in such relation as to bring the first and second planes into mutually perpendicular relation. In particular, the invention relates to an optical alignment system of this type which is particularly suitable for use in aligning automobile components such as head lamps and road wheels on the remainder of the automobile. However, the system may also be utilized in many other alignment applications.

In aligning automobile components such as road wheels and head lamps in desired predetermined relation to the remainder of the automobile, various optical and mechanical systems are currently in use. These systems are typically utilized for example to adjust the road wheels of an automobile for toe-in and camber and to adjust the head lamp position to direct the head lamp beams in an optimum pattern.

Although various well-known devices for these purposes have been in use for long periods, such prior devices are sometimes subject to significant disadvantages.

For example, some types of road wheel aligning device require complicated mechanical yokes to be attached to and extend between opposite road wheels of the vehicle, together with wheel contacting rollers and other linkages. Such prior mechanical devices have therefore often required considerable capital investment, have been prone to inaccuracy due to distortion of mechanical components encountered in ordinary use, and in some instances, have been of limited application on only certain sizes and makes of automobiles, thus reducing their general utility. Furthermore, such prior systems have often been relatively time consuming in their use as well as requiring a degree of skill beyond the competence of some service station personnel.

Other problems are associated with several types of head lamp aiming device in current use. Several of these devices need to be leveled by use of a spirit level before the alignment operation may be conducted. However, the use of a spirit level may frequently be rendered extremely difficult, or even impossible if the automobile is in an environment subjected to a certain amount of continuous vibration. For example, the installation of head lamps at a manufacturer's plant when the automobiles are moving continuously on conveyor systems may be attended by continuous level of vibration too high to permit the use of a head lamp aligning device utilizing a spirit level.

SUMMARY OF THE INVENTION

It is, therefore, a general object of the invention to provide a system of alignment which obviates or minimizes problems of the type generally noted above.

It is a particular object of the invention to provide a system of alignment particularly suitable for automobile alignment applications.

It is a further object of the invention to provide a system of alignment for automobile road wheels and head lamps which requires moderately low capital investment, does not require a high degree of skill, and which retains its accuracy despite the wear and tear of normal use.

It is yet another object of the invention to provide an alignment system for automobile applications which is of general applicability to substantially all types of automobile.

It is a further object of the invention to provide a system of alignment for automotive applications which are conducted under the circumstances of a continuous level of moderate vibration, wherein the vibration does not render the system of alignment incapable of operation.

A method of alignment according to a preferred embodiment of the invention is intended to accomplish at least some of the foregoing objects. The method utilizes a device intersected by a first plane of the device and a reflecting surface disposed in a second plane. The method is intended to align the device and the reflecting surface in such relation as to place the planes in mutually perpendicular relation. The method includes the steps of providing a nondirectional source of light on the device positioned in the first plane and of placing the device before the reflecting surface to produce a brightness zone thereon. Further, steps include connecting at least two signal producing light detectors with the device with each detector being medially intersected by and extending on opposite sides of the first plane. The detectors have beams of sight diverging from each detector to the reflecting surface to view the brightness zone. The beams of sight are intersected by two barriers on the device, each barrier being associtated with one of the light detectors. The barriers are caused to extend oppositely from the first plane to at least partially intersect the lines of sight of the associated light detectors to cause partial obscuring thereof.

The barriers are arranged in such mutual relation that the light detectors are partially obscured by equal amounts to produce equal signals only when the first plane is perpendicular to the second plane. Inclination of the first plane from the perpendicular relative to the second plane causes one of the beams to move further into its associated beam of sight to cause increased obscuring of one detector while the other barrier moves further out of its associated beam of sight to cause decreased obscuring of the other detector. This causes unequal signals to be developed.

It will be appreciated that as the device is moved angularly relative to the second plane, observation of the relative magnitudes of the signals produced by the light detectors provides a way of ascertaining when the first plane of the device is in perpendicular relation to the plane of the reflecting surface because only at that time are the signals equal. Thus, in an application where a reflecting surface is set up in a predetermined reference plane, it is possible to attach the device to some component to be set at perpendicular relation to the known reference plane and move the device until the desired perpendicular relation is achieved.

The method is of particular (but not exclusive) application for aligning an automobile component on an automobile so that the component is positioned with an axis of the component at a predetermined angle to a predetermined axis of the automobile. The method utilizes a plane reflecting surface positioned externally of the automobile. The method also utilizes a device having a light source positioned in an optical plane of the device for producing a brightness zone on the reflecting surface with at least two signal producing, light detecting means connected with the device extending on opposite sides of the optical plane for detecting the brightness zone. The light detecting means produce equal signals only when the optical plane of the device is precisely perpendicular to the plane reflecting surface. The method includes an initial step of positioning the automobile adjacent the reflecting surface with the predetermined axis of the automobile in perpendicular relation to the plane of the reflecting surface. Then a support is attached to the automobile component to be carried thereby. The device is then mounted on the support with the optical plane of the device in generally perpendicular relation to the plane of the reflecting surface. The device is moved angularly on the support to offset the optical plane of the device from perpendicular to the reflecting surface by an angular amount equal to the predetermined angle to which the auto component is to be aligned relative to the automobile. Finally, the position of the auto component relative to the remainder of the automobile is moved to bring the optical plane of the device into the perpendicular relation to the mirror to cause equal signals to be produced by the light detector means when the automobile component is set at a predetermined angle.

In an additional refinement to this method to aid a mechanic adjusting the automobile component who may be unable to position himself to observe any visual indicia of the light detector signals, a buzzer or other noise producing means is connected with the light detector means. The buzzer is silent only when the signal produced by the light detector means are equal. Thus, the operator adjusting the automobile component ceases to make further adjustment when the noise produced by the detector ceases because at that time the component has been set to the predetermined angle.

An apparatus aspect of the invention resides in the provision of an alignment device intersected by an optical plane of the device. The device is intended for alignment with a plane reflecting surface in such relation that the optical plane of the device may be disposed in perpendicular relation to the plane of the reflecting surface. The alignment device includes a housing intersected by the optical plane. A nondirectional source of light connected with the housing disposed in the optical plane faces outwardly thereof and, when directed toward the reflecting surface, creates a brightness zone thereon. First and second signal producing light-detecting means are connected with the housing on opposite sides of the optical plane. The light-detecting means are each medially intersected by the optical plane. The first and second light detecting means have first and second beams of sight respectively extending between the light detecting means and the brightness zone. First and second barriers connected with the housing associated with the respective light detecting means extend oppositely from the optical plane partially into the first and second beams of sight respectively to partially obscure the respective light detecting means. The first and second light detecting means are partially obscured by equal amounts to produce equal signals only when the optical plane is precisely perpendicular to the plane of the reflecting surface. Upon inclination of the first plane from the perpendicular relative to the reflecting surface, increased obscuring of one of the light detecting means occurs accompanied by decreased obscuring of the other so that unequal signals are provided.

An apparatus aspect of the invention is particularly suitable for aligning an auto component on an automobile to thereby position an axis of component at a predetermined angle to a predetermined axis of the automobile. The installation includes a vehicle bay within which the automobile is positioned. A plane reflecting surface is connected with the bay positioned externally of the automobile in perpendicular relation to the predetermined axis of the automobile. An alignment device intersected by an optical plane of the device is provided. The alignment device includes a light source positioned within the optical plane for producing a bright zone on the reflecting surface. The device also includes at least two, signal producing, light detecting means on opposite sides of the optical plane for viewing the brightness zone. The two light detecting means produce equal signals only when the optical plane of the device is precisely perpendicular to the plane of the reflecting surface. A support adapted for releasable connection to the automobile component is carried thereby. Pivotal connection means is provided for connecting the device with the support to cause the optical plane of the device to be directed in generally perpendicular relation to the reflecting surface. The pivotal connecting means enables angular adjustment of the device relative to the support to be made so as to position the optical plane of the device in a predetermined offset angle from the perpendicular to the reflecting surface.

THE DRAWINGS

A system of alignment, particularly suitable for automotive applications, according to certain preferred embodiments of the invention is illustrated in the accompanying drawings in which;

FIGS. 9 and 10 illustrate two successive method steps of adjusting toe-in of a front road wheel of the automobile utilizing the installation shown in FIG. 5;

FIGS. 11 and 12 illustrate two successive method steps in adjusting camber of the road wheel of the automobile utilizing the installation shown in FIG. 5;

FIG. 13 illustrates a method step performed in adjusting a head lamp of the automobile for longitudinal alignment utilizing the installation shown in FIG. 5; and FIG. 14 illustrates a method step performed in adjusting the head lamp of the automobile for vertical alignment utilizing the installation shown in FIG. 5.

DETAILED DESCRIPTION

The alignment device

Figure 1:
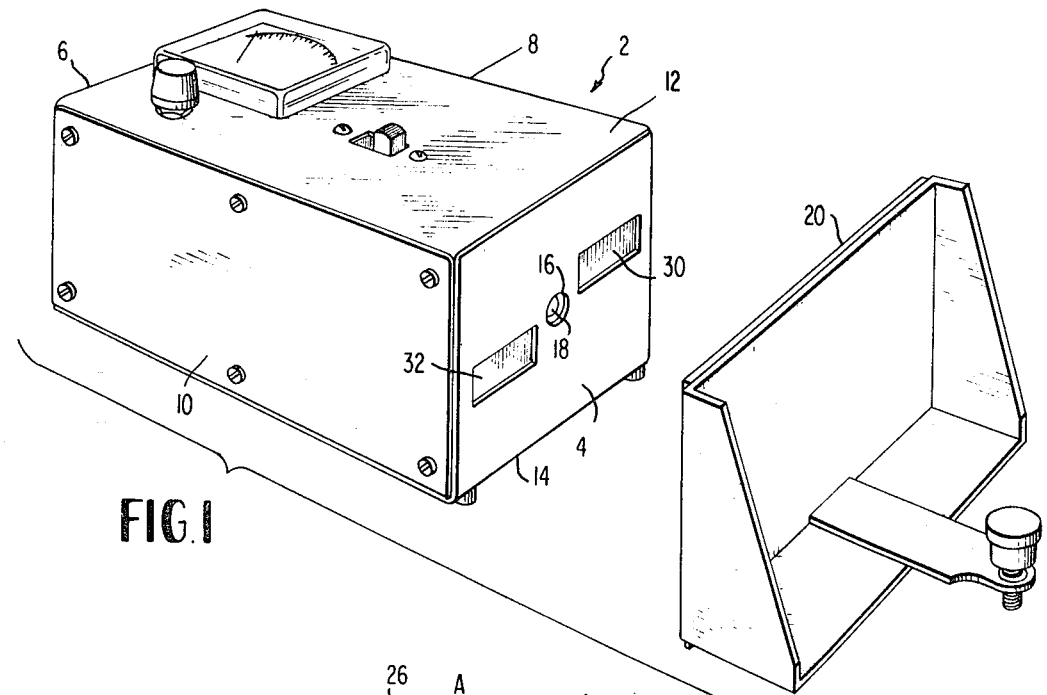
FIG. 1 is a perspective view of an alignment device constructed in accordance with a preferred embodiment of the invention with the device shown before a test mirror.

Referring to FIG. 1 of the drawing, a device constructed in accordance with a preferred embodiment of the invention is there illustrated. The device includes a generally rectangular box 2 having vertical, front and rear end walls 4 and 6, vertical, left and right side walls 8 and 10 and horizontal, top and bottom walls 12 and 14 respectively. Positioned within a central aperture 16 in the front wall 4 is a small light bulb 18 which serves as a generally nondirectional source of light. The device 2 is intended to be utilized with any plane reflecting surface and for the purpose of illustration a vertically and transversely extending reflecting surface 20 in the form of a mirror mounted on a suitable conventional test stand is shown. In the preferred embodiment, the reflecting surface 20 is a conventional silvered plate glass mirror, however, other reflecting surfaces such as glass beaded screens, polished stainless steel or the like may be equally used.

Figure 2:
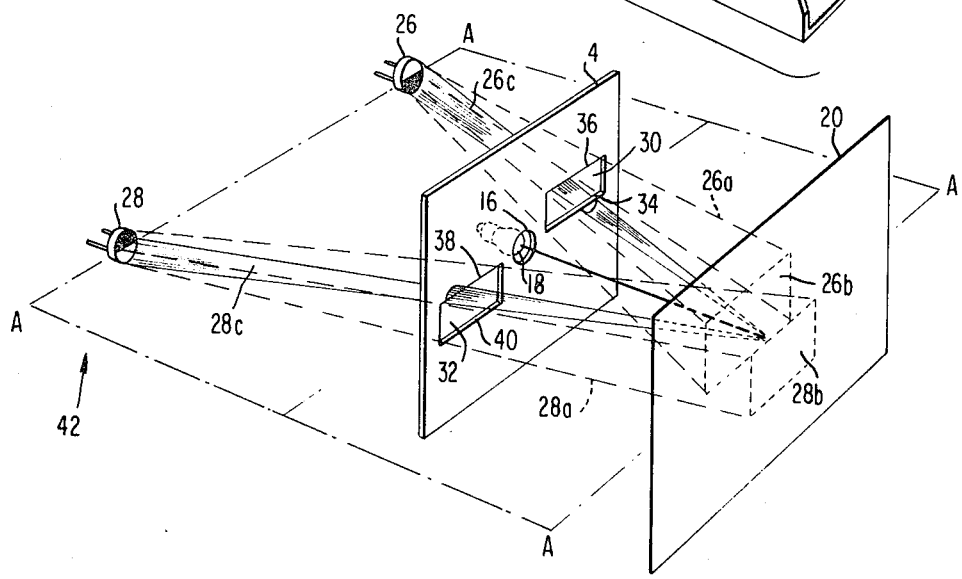
FIG. 2 is a simplified perspective view of various light paths associated with the device shown in FIG. 1.

The device 2 is placed with the light 18 facing the reflecting surface 20 so that some of the rays of light leaving the nondirectional source 18 in all directions are incident upon the reflecting surface 20. These rays create an illuminated target 24 (FIG. 2). The illuminated target 24 is in the form of a circular brightness zone which is surrounded by relatively less sharply illuminated, umbral zones. However, a point like target may also be provided. Within the relatively small range of inclination from the perpendicular within which the device 2 is customarily operated (typically about 15° either side of perpendicular) the target or brightness zone 24 does not appreciably change either its size, brightness characteristics or location as the inclination of the device 2 relative to the reflecting surface 20 is changed.

The brightness zone 24 is viewed by left and right, light detectors 26 and 28 respectively, which, in the preferred embodiment, comprise generally disc like, photo-sensitive resistors. The detectors 26 and 28 and the light source all lie in and are longitudinally intersected by a horizontal first median plane (indicated as A—A on FIG. 2), hereinafter referred to as the optical plane of the device. The light detectors 26 and 28 are spaced equal transverse distances on opposite sides of the light source 18. The light detectors have separate lookout paths 26a and 28a respectively (depicted by the dotted lines in FIG. 2) to the target 24 on the reflecting surface 20, through left and right rectangular apertures 30 and 32 respectively provided in the end wall 4. Very significantly the apertures 30 and 32 are of larger area than the light detectors 26 and 28 so that each detector has a diverging lookout path extending toward the reflecting surface 20. The lookout paths cover fairly wide areas 26b and 28b of the reflecting surface and thereby enable at least one of the detectors to pick up the target 24 even at quite a substantial inclination from the perpendicular to the reflecting surface. This avoids problems of limited vision which might reduce the utility of the device. As each detector 26 and 28 acquires the target 24, a beam of sight 26c and 28c respectively extends between the detector and the target.

The left aperture 30 associated with the left light detector 26 has a horizontal lower edge 34 disposed generally in the optical plane A—A. An upper edge 36 is spaced above the lower edge 34 in parallel coextensive relation thereto.

The right aperture 32 includes a horizontal, upper edge 38 disposed in the optical plane A—A and a parallel lower edge 40 displaced below and coextensive with the upper edge 38.

In use, the lower edge 34 of the left aperture 30 functions as an optical barrier projecting sufficiently into the beam of sight 26c to cause the lower half of the light detector 26 below the optical plane A—A to be completely obscured when the optical plane A—A is perpendicular to the reflecting surface 20. Similarly, the upper edge 38 of the right aperture 32 constitutes another optical barrier projecting sufficiently into the beam of sight 28c between the right light detector 28 and the brightness zone 24 to cause the upper half of the right light detector 28 above the optical plane A—A to be completely obscured when the optical plane is perpendicular to the reflecting surface 20. In this condition (as shown in FIG. 2) the light detectors 26 and 28 are each partially obscured by an equal amount, namely half obscured, so that the resistances of the detectors are equal.

If, however, the device is now rotated slightly with reference to the reflecting surface to move the optical plane A—A upwardly in the direction indicated by the arrow 42 in FIG. 2, the situation of balance is changed. This is because the upward motion causes the lower edge or barrier 34 of the right aperture 30 to move upwardly to project further into the beam of sight 26c of the left detector 26 to the target 24 which, as discussed, remains substantially constant in location, brightness and size. This causes a greater proportion of the surface of the light detector 26 to be obscured. At the same time, the upward angular motion of the device moves the upper edge or light barrier 38 of the right aperture 32 further out of the beam of sight 28c of the right detector 28 to the target so that the right light detector becomes correspondingly less obscured.

It will be appreciated that the unequal amounts of light now falling on the two photo sensitive resistors 26 and 28 causes them to become of unequal resistance and that this difference in resistance may be readily detected to give an indication that the optical plane A—A of the device is no longer perpendicular to the plane of the reflecting surface 20.

Figure 3:
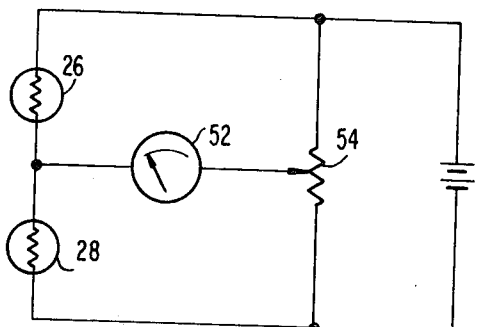
FIG. 3 is a simplified electrical schematic of an electrical circuit associated with the device shown in FIG. 1.

In the preferred embodiment the change of resistance is detected by incorporating the left and right detectors 26 and 28 into a conventional Wheatstone bridge circuit 50 (FIG. 3). The circuit 50 is provided with a galvanometer 52 for giving a null reading when the photo sensitive resistors 26 and 28 have equal resistance and also includes as the other portion of the Wheatstone bridge, two halves of a center tapped variable potentiometer 54 which may be adjusted for zero calibration of the circuit prior to use.

In an alternative embodiment of the Wheatstone bridge circuit, the galvanometer 52 is replaced by a buzzer unit 56 which is set to give an audible buzzing signal whenever the resistors 26 and 28 are unbalanced. (Because the small out of balance currents in the bridge circuit are unlikely to be sufficient to operate a buzzer, it may be necessary to utilize the out of balance current to actuate a servo-circuit delivering power to the buzzer. However, it will be appreciated that these are merely routine details of electrical circuitry.)

The purpose of using an audible buzzer rather than the galvanometer will be discussed subsequently.

It is desirable to ensure that the device is sensitive to misalignment only about the one optical plane A—A. To avoid the possibility that other edges of the apertures might intersect the beams 28c and 26c to cause sensitivity of the device to inclination in planes other than the optical plane A—A, the apertures 30 and 32 are made sufficiently transversely wide for the vertical edges of the apertures not to intersect the beams. In addition, the light detectors 26 and 28 are spaced sufficiently transversely apart to direct the beams obliquely through the central area of each of the apertures 30 and 32 well away from the vertically extending transverse edges of each aperture.

The device 2 may be utilized in a large range of applications where it is desired to determine a perpendicular to a reflecting surface which is known to be disposed in a predetermined reference plane. Although of such general application, the device is hereinafter discussed with particular reference to certain automotive applications for which it is particularly suitable.

The automobile alignment installation

Figure 5:
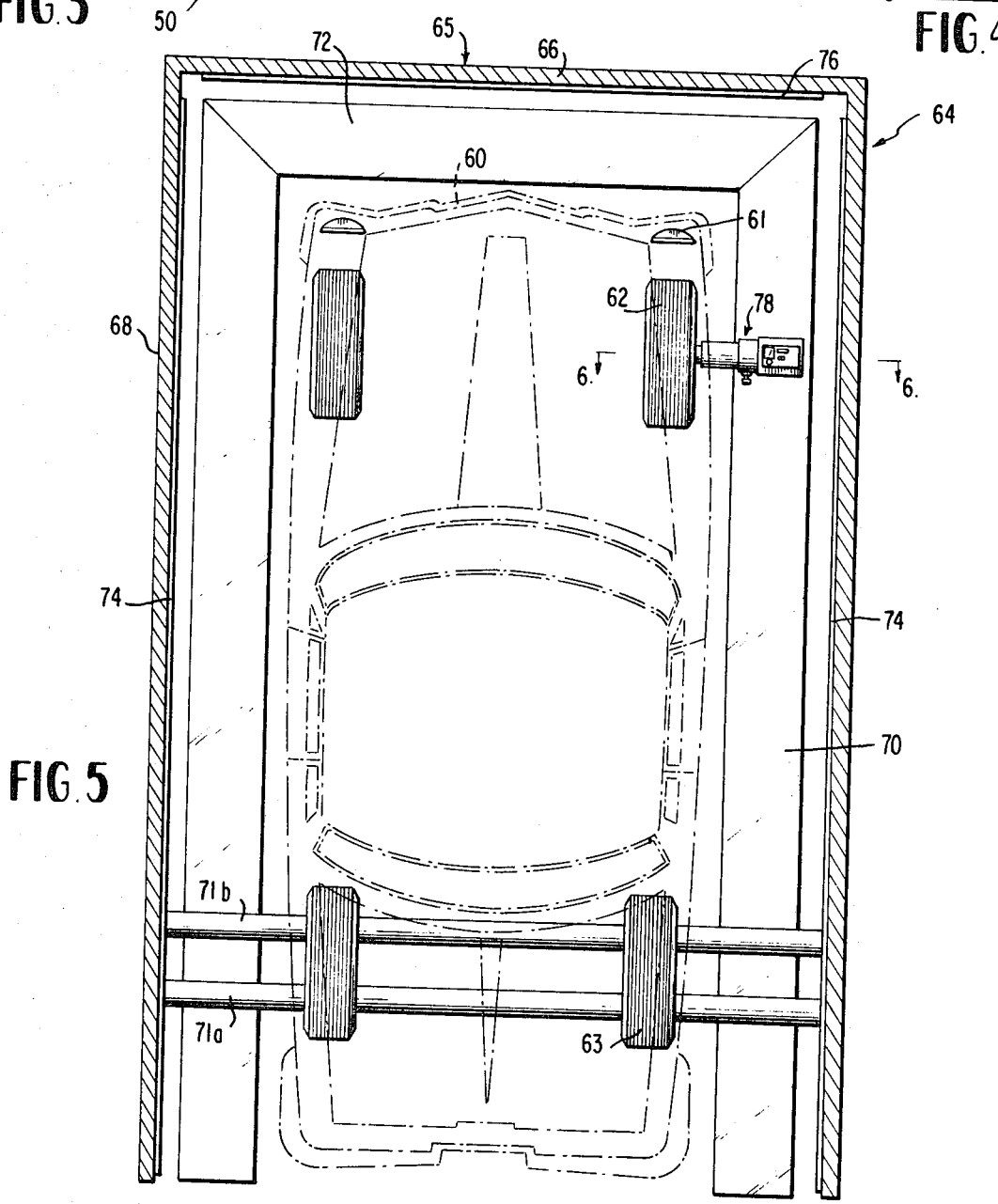
FIG. 5 is a top view of an automobile alignment installation including an automobile positioned in an alignment bay equipped for the practice of various method embodiments of the invention.

Referring to FIG. 5, automobile 60 which is to have various components, including its head lamps 61 and front and rear road wheels 62 and 63, respectively, aligned in particular relation to the remainder of the automobile is shown. The automobile is positioned in a special alignment installation generally designated 64. The installation 64 includes a vehicle bay 65 having a ground level base and defined by a vertically and transversely extending front wall 66 and by spaced, opposed, longitudinally extending, vertical side walls 68. The automobile 60 may be driven into the bay 65 with the automobile positioned generally centrally between and parallel to the side walls 68.

For reasons to be discussed hereinafter, it is often necessary to position the automobile 60 with its front and rear transverse suspension axes perpendicular to the side walls 68 of the bay. For this purpose, two longitudinally spaced transversely extending parallel rollers 71a and 71b are positioned adjacent the open end of the bay. As the automobile is moved into the bay, the rear wheels 63 are moved intermediate the rollers 71a and 71b and rest thereupon to align the front and rear transverse suspension axes of the automobile perpendicularly to the side walls 68.

Positioned within the bay 64 at ground level are two longitudinally extending, upwardly facing, flat, horizontal reflecting surfaces 70. The reflecting surfaces in the preferred embodiment comprise conventional silvered glass mirrors, however other reflecting surfaces such as polished stainless steel, glass beaded reflecting cloth, and the like may be utilized. The reflecting surfaces 70 extend alongside the automobile 60 when the latter is in its central position within the bay and are spaced sidewardly thereof. A transversely extending, horizontal, flat forward reflecting surface 72 extends between the side mirror 70 at their forward ends spaced forwardly adjacent the front end of the automobile.

Also provided are two opposed vertically mounted, longitudinally extending, side reflecting surfaces 74 fixedly secured to the side walls 68 of the bay facing inwardly toward the automobile 60. Each of the vertical side mirrors 70 extends vertically (FIG. 6) from a point slightly below the hub height of the automobile 60 to a level generally adjacent the upper part of the road wheels. A front vertical mirror 76 (FIG. 5) vertically coextensive with the side mirrors 74, is fixedly secured to the front wall 66 of the bay facing toward the automobile 60.

The horizontal and vertical mirrors 70, 72 and 74, 76 just described are utilized in conjunction with an alignment unit 78 to align various components of the automobile in their desired relation to the remainder of the automobile.

Figure 6:
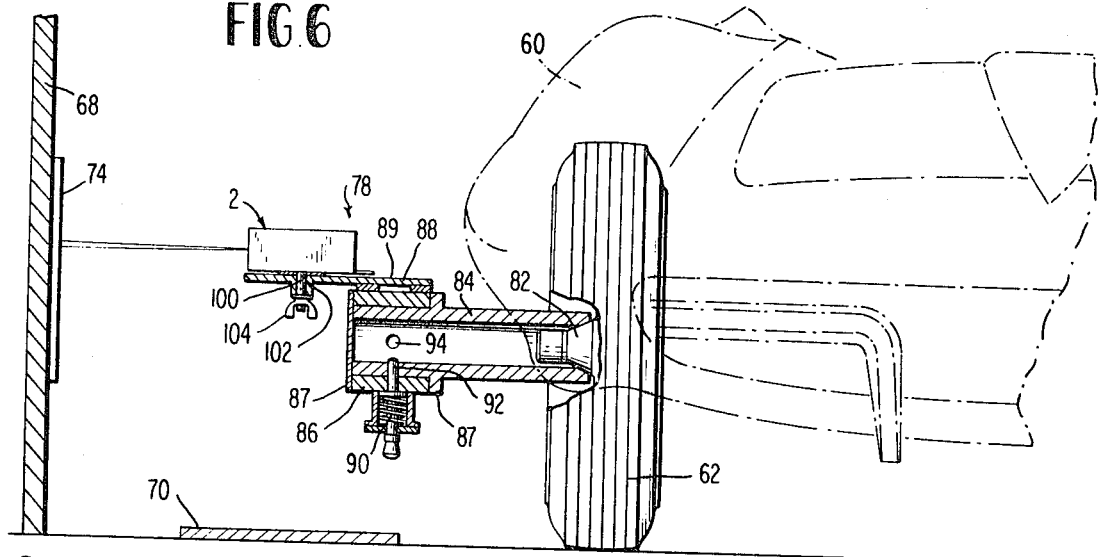
FIG. 6 is a front view partially in cross section of an alignment unit forming a portion of the installation shown in FIG. 5 taken along the lines 6—6 therein.
Figure 7:
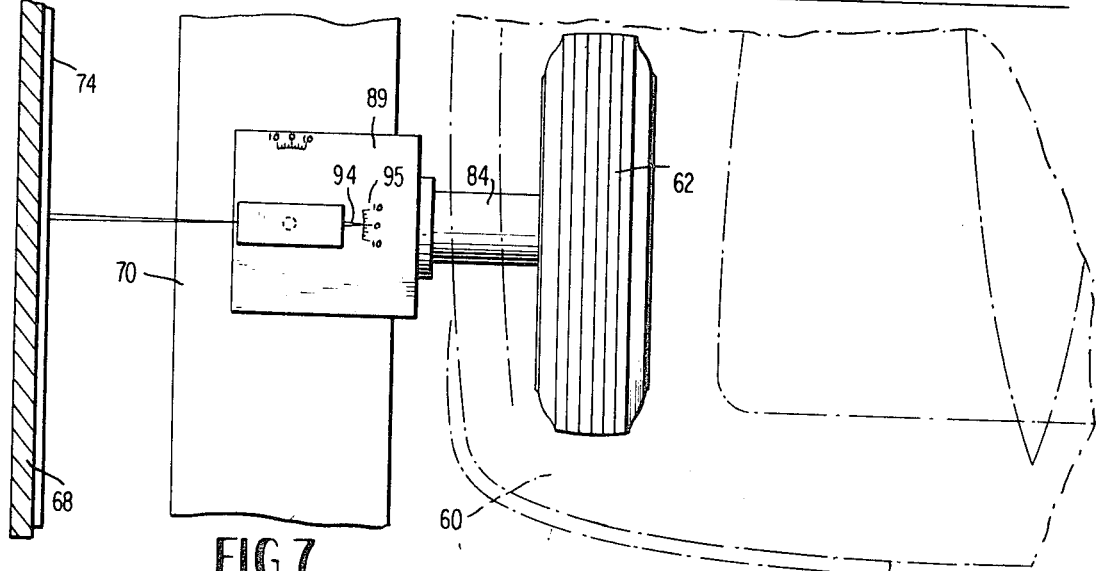
FIG. 7 is a top view of the portion of the installation shown in FIG. 6.
Figure 8:
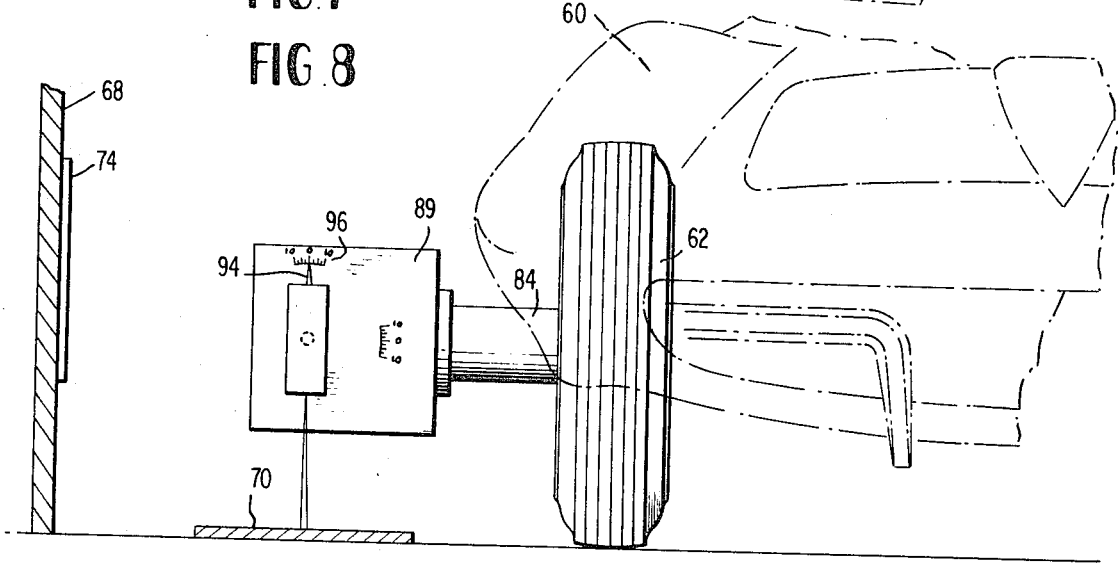
FIG. 8 is a view of the installation shown in FIG. 6 but with an optical device performing a part of the installation shown moved through 90° to a vertical and downwardly directed position.

The alignment unit 78 is shown in more detail in FIGS. 6, 7 and 8. There the automobile 60 may be seen to include one of the front road wheels 62 resting upon the ground. The road wheel 62 is of conventional construction and includes a central, sidewardly projecting wheel hub 82. The alignment unit 78 includes a horizontal tubular member 84 which is releasably secured to the hub 82 extending generally concentrically and sidewardly from the wheel 62. The member 84 is provided with magnetic portions at its end adjacent the hub for grippingly and tenaciously securing the member to the wheel hub. The precise construction by which the member 84 is secured to the hub 82 does not, however, form a particular part of this invention as several such connecting devices are presently commercially available.

At its free end the member 84 is provided with a concentric annular collar 86 fitting slidably and snugly about the exterior of the member 84. Suitable projecting portions 87a and 87b are provided on the member 84 to prevent axial motion of the collar 86. The collar 86 has fixedly secured to it a sidewardly and longitudinally extending, rectangular platform 88 having a flat horizontal upper mounting surface 89. The platform 88 is maintained in position by a spring loaded plunger 90 secured to the collar 86 and engaging an opening 92 positioned centrally at the bottom of the member 84. However, the collar 86 and the platform 88 may be rotated to a second position (FIG. 8) in which the upper mounting surface 89 of the platform 88 is disposed in a vertical plane by withdrawing the plunger 90 from the aperture 92 and rotating the collar about the member 84 through 90° to engage the plunger with a second aperture 94 in the member.

The purpose of the platform 88 is to support an alignment device 2 of the type described earlier. The alignment device 2 is pivotally connected to the upper surface of the platform 88 with optical plane A—A of the device perpendicular to the mounting surface 89 of the platform 88. This pivotal connection is achieved by fixedly connecting a shaft 100 to the center of the side wall 10 extending perpendicularly therefrom. The device 2 is turned to position the shaft 100 extending vertically downward and the shaft is slid into an opening 102 in the platform 88 which slidably and snugly receives the shaft 100. At its lower free end the shaft 100 is threaded to receive a wing nut 104 which may be tightened up against the platform 88 to secure the device 2 against further rotation about the shaft 100 relative to the platform 88.

It will be appreciated that mounting the device 2 (FIG. 6) with its side wall 10 in contact with the horizontal upper mounting surface 89 causes the optical plane A—A of the device 2 to extend vertically and transversely. Similarly, when the platform 88 is rotated through 90° to its vertical position (FIG. 8) the optical plane of the device 2 extends vertically and longitudinally.

To enable the optical plane A—A of the device 2 to be set in predetermined relation to the remainder of the alignment unit, the device 2 is provided with a pointer 94 (FIG. 7) disposed in the optical plane A—A of the device extending longitudinally therein from the end wall of the device 2 remote from the source of light. The pointer 94 moves over a graduated scale of degrees 95 having a zero degree position aligned with the axis of the member 84 of the alignment unit 78. Thus, by moving the pointer 94 over the scale 95 to pivot the device 2 about its shaft 100, the optical plane of the device 2 may be offset at any predetermined angle from the axis of the member 84. A second scale 96 (FIG. 8) positioned at 90° from the first scale 95 is also provided. This is for use when the mounting surface 89 is disposed vertically as it enables the pointer 94 to be traversed over a different range of degrees perpendicular to the horizontal axis of the member 84.

Automobile alignment operations

Various methods of alignment particularly suitable for automotive applications, wherein an automobile component is to be adjusted in particular relation to the remainder of the automobile, will now be discussed.

In FIGS. 9 and 10, the installation is shown in successive stages of a method sequence for adjusting the toe-in of the front wheel 62 of the automobile 60. In this operation the automobile 60 is moved into the bay 64 until the rear road wheels of the automobile move between and rest upon the previously mentioned transverse rollers 71a, 71b to locate the automobile in its desired predetermined location relative to the bay 64 with the front and rear transverse suspension axes of the vehicle perpendicular to the side vertical reflecting surfaces 74.

Figure 4:
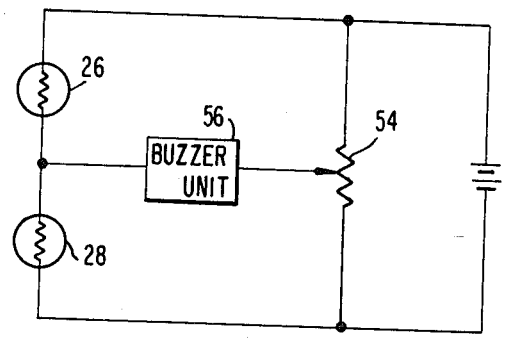
FIG. 4 is a simplified electrical schematic of a first alternative embodiment of the electrical circuit for the device shown in FIG. 1.

The alignment unit 78 is then attached to the one of the front road wheels 80 to be adjusted and the platform 88 is moved to its upper horizontal position by adjustment of the collar 86 as described. At this time the optical device 2 will have its optical plane A—A extending vertically and directed generally perpendicularly toward the reflecting surface 74 (FIG. 9). The wing nut 104 is then slackened off and the device 2 is pivoted angularly about its pivot axis 100 to offset the optical plane A—A of the device from perpendicular relation to the reflecting surface 74 by an angle equal to the desired degree of toe-in. The angle of offset is measured by movement of the pointer 94 on the first graduated scale 95. At this time the optical plane A—A is inclined to the adjacent reflecting surface 74 so that the device is in an unbalanced condition. Thus utilizing the electrical circuit shown in FIG. 4 provided with a buzzer 56, a continuous buzzing note will be heard. The mechanic then moves beneath the automobile and adjusts the road wheel 62 relative to the front suspension of the automobile for toe-in in the conventional manner. As the wheel moves to the desired degree of toe-in (FIG. 10), the platform 88 and the device 2 supported thereon are rotated through a corresponding angular amount thus bringing the optical plane of the device 2 into perpendicular relation with the reflecting surface 74. When the perpendicular relation is achieved, the buzzing ceases in the manner previously discussed so the mechanic is informed that the desired degree of toe-in has been set.

A similar sequence of operations may be performed for the front road wheel 62 on the other side of the vehicle 60.

The installation is also equally suitable for adjustment of the camber of the road wheels 62, 63 of the automobile utilizing a method sequence illustrated in FIGS. 11 and 12. For this purpose the collar 86 is rotated about the sleeve 84 to bring the mounting surface 89 of the platform 88 into the longitudinal, vertical plane. The device 2 is then rotated through 90° about its pivot shaft 100 to cause the optical plane A—A of the device to extend longitudinally and to be directed generally perpendicularly down toward the mirror 7. The device 2 is then offset by a predetermined angle equal to the desired angle of camber to be set by movement of the pointer 94 over the second calibrated scale 96 (FIG. 11). As before, an unbalanced buzzing condition of the device 2 now ensues. The mechanic then proceeds beneath the vehicle in the conventional manner and adjusts the camber of the wheel until the wheel is inclined to the vertical by the desired amount (FIG. 12) thus moving the device 2 a corresponding angular amount into perpendicular relation with the mirror 70. This causes the buzzing to stop to inform the mechanic that the desired angle of camber has been set.

The installation may also be utilized for head lamp adjustment. For this purpose the installation 78 is provided with a suitable vacuum cup attachment 110 at the end of the member 84 remote from the platform 88. The vacuum cup attachment 100 secures the sleeve 84 to the head lamp 109 in concentric relation with the longitudinal axis of the head lamp. A suitable form of vacuum cup attachment is disclosed in applicant's U.S. Pat. No. 2,997,914.

The axis of the head lamp 61 may be set for correct longitudinal adjustment in relation to the longitudinal axis of the automobile by following a method sequence involving a step illustrated in FIG. 13. The platform 88 is moved to the uppermost position to dispose the mounting surface horizontally and the optical device 2 has the optical plane A—A directed sidewardly to the 90° position by movement of the pointer 94 relative to the scale 95. The headlamp 61 is then adjusted relative to the remainder of the automobile 60 by usual conventional methods until the optical plane of the device 2 is precisely perpendicular to the mirror 74 as will be indicated by cessation of buzzing.

Another method operation, intended for alignment of the head lamp 61 in the vertical plane, is shown in FIG. 14. There the platform 88 is rotated through 90° to its vertical position and the device 2 rotated about its pivot shaft 100. With the device 2 thus in its downward facing position, the optical plane A—A is inclined downwards to the 90° position as set by movement of the pointer 94 across the second scale 96. The head lamp 109 is then conventionally adjusted relative to the automobile until the optical plane A—A of the device is perpendicular to the underlying front reflecting surface 72.

Although the head lamp adjustments for longitudinal and vertical alignment have been described with reference to perpendicular alignment to the mirrors 74 and 72, it will be readily appreciated that other degrees of head lamp settings may be easily obtained by offsetting the device 2 on the platform 88 by any predetermined amount in a manner similar to that discussed for the camber and toe-in wheel adjustments previously described.

SUMMARY OF ADVANTAGES

In utilizing a system of alignment according to the present invention, certain significant advantages are provided.

The system is particularly suitable for use in automotive applications as the installation bay and the alignment unit are of general application to all types and sizes of automobile and are not restricted by mechanical limitations to connection to only certain sizes and types of automobile.

Particular advantages are provided by the simple nature of the equipment required. These advantages include low capital cost, ease of attachment and removal of the alignment unit to and from the automobile to facilitate rapid working, and minimum number and size of parts thus minimizing the possibility of inaccurate alignment caused by damage or deterioration of the equipment in use.

Also significant is the audible adjustment signal which enables adjustment of the particular automobile component to be effected by the workman even at times when his working position may necessarily prevent him from visually observing the alignment unit.

The absence of any bubble-type orienting device is also important in that the sensitivity of the installation to a moderate but continuous level of vibration is substantially unimpaired.

Although the invention has been described with reference to certain preferred embodiments, it will be appreciated by those skilled in the art that many additions, deletions, substitutions, modifications and other changes may be made which will fall within the purview of the appended claims.

What is claimed is:
1. A method of aligning two planar surfaces, the method including the steps of:
   projecting from a light source generally nondirectional light through a first planar surface onto a planar reflecting surface;
   receiving through apertures in the first planar surface light reflected from the planar reflecting surface upon a pair of spaced apart signal producing, light detecting means positioned behind the first planar surface, said signal producing light detecting means and said source of light lying in an optical plane perpendicular to the first planar surface;
   shading by the edges of the apertures a portion of the reflected light received from the reflecting surface by an equal amount when the optical plane is perpendicular to the reflecting planar surface to cause the light detectors to produce equal signals; and
   moving the first planar surface angularly in relation to the planar reflecting surface until equal signals are produced by the light detecting means whereby the optical plane will lie perpendicular to the planar reflecting surface.

2. A method of aligning an automobile component on an automobile to position an axis of the component at a predetermined angle to a predetermined axis of the automobile, the method utilizing a plane reflecting surface positioned externally of the automobile, the method further utilizing a device having a light source positioned in an optical plane of the device for producing a brightness zone on the reflecting surface and at least two signal producing, light detecting means, each extending on opposite sides of the optical plane for detecting the brightness zone, the two light detecting means producing equal signals only when the optical plane of the device is precisely perpendicular to the plane of the reflecting surface, the method comprising the steps of, positioning the automobile adjacent the reflecting surface with the predetermined axis of the automobile in perpendicular relation to the plane of the reflecting surface;

attaching a support to the automobile component to be carried thereby;

mounting the device on the support with the optical plane of the device in generally perpendicular relation to the plane of the reflecting surface;

moving the device angularly on the support to offset the optical plane of the device from the perpendicular to the reflecting surface by an angular amount equal to the predetermined angle to which the automobile component is to be aligned relative to the automobile; and moving the position of the automobile-component relative to the remainder of the automobile to bring the optical plane of the device into perpendicular relation to the reflecting surface to cause equal signals to be produced by the light detector means when the automobile-component is set at the predetermined angle.

3. A method as defined in claim 2 wherein the automobile-component to be aligned is a front road wheel of the automobile with the component axis comprising the axis of rotation of the wheel and wherein the predetermined axis of the automobile is a horizontal, transverse, front suspension axis of the automobile and wherein the predetermined angle at which the wheel axis is to be set is a toe-in angle of inclination to the front suspension axis of the automobile, and wherein the step of positioning the automobile adjacent the mirror includes the steps of, connecting the reflecting surface with the ground in vertically and longitudinally extending disposition positioned at generally wheel height of the automobile above the ground, moving the automobile on the ground adjacent the reflecting surface to locate the transverse front suspension axis of the automobile in perpendicular relation to the reflecting surface;

and wherein the steps of attaching the support and mounting the device on the support include, securing the support to a hub of the wheel with the support having a mounting surface extending generally horizontally and sidewardly from the wheel hub toward the reflecting surface; and pivotally connecting the device with the mounting surface for angular motion about a vertical pivot axis with the optical plane of the device disposed vertically and directed generally perpendicularly to the reflecting surface.

4. A method as defined in claim 3 wherein the step of moving the automobile includes, mounting at least one pair of longitudinally spaced, transversely extending, opposed locating members in perpendicular relation to the reflecting surface, and moving the automobile alongside the reflecting surface generally parallel thereto until the rear wheels of the automobile rest centrally on and between the members to centralize the automobile with the longitudinal axis thereof generally parallel to the reflecting surface and with the transverse front suspension axis generally perpendicular to the reflecting surface.

5. A method as defined in claim 2 wherein the automobile-component to be aligned is a road wheel of the automobile with the component axis comprising a generally vertical diameter of the wheel intersecting the point of contact of the wheel with the ground and wherein the predetermined axis of the automobile is a vertical axis thereof intersecting the point of contact of the wheel with the ground and wherein the predetermined angle at which the vertical axis wheel is to be set is a camber angle inclined to the vertical axis of the automobile, and wherein the step of positioning the automobile adjacent the reflecting surface includes, connecting the reflecting surface with the ground in longitudinally extending, horizontal disposition positioned generally below hub height of the autmobile;

moving the automobile on the ground to position the road wheel adjacent the reflecting surface;

and wherein the steps of attaching the support and mounting the device on the support include, securing the support to the hub of the wheel with the support having a mounting surface extending generally vertically and sidewardly from the wheel towards the reflecting surface; and pivotally connecting the device with the mounting surface for angular motion about a horizontal, longitudinally extending pivot axis with the optical plane of the device extending longitudinally and directed downwardly in generally perpendicular relation to the reflecting surface.

6. A method as defined in claim 2 including an additional step of causing the device to emit an audible signal except when the light detecting means are producing equal signals.

7. An alignment device, the device being intersected by an optical plane of the device, the device being intended for alignment with a plane reflecting surface in such relation that the optical plane of the device is disposed in perpendicular relation to the plane of the reflecting surface, said alignment device comprising, a housing intersected by the optical plane, a nondirectional source of light connected with said housing disposed in the optical plane facing outwardly of the housing, said source of light when facing toward the reflecting surface creating an illuminated target thereon, first and second signal producing, light-detecting means intersecting said optical plane and connected with the housing on opposite sides of the light source, said first and second light-detecting means having, first and second lookout paths extending divergently between said first and second light-detecting means respectively and said reflecting surface for scanning said surface over a greater area than the area of said target, first and second beams of sight respectively within said lookout paths, said beams extending between said light-detecting means and the said target, first and second barrier plates connected with the housing extending oppositely from the optical plane partially into said first and second beams of sight respectively, each said barrier plate being associated with a respective one of said light-detecting means to partially obscure said light detecting means, said first and second barrier plates being fixedly interconnected and partially obscuring said first and second light-detecting means by equal amounts to produce equal signals only when the optical plane is perpendicular to the plane of the reflecting surface, whereby one of said barrier plates upon inclination of the optical plane from the perpendicular relative to the reflecting surface moves further into the associated beam of sight to cause increased obscuring of the associated one of said light-detecting means, the other of said barrier plates concurrently moves further out of the associated beam of sight to cause decreased obscuring of the other light detecting means to cause said first and second light-detecting means to provide unequal signals.

8. An installation for aligning an auto-component on an automobile thereby to position an axis of the component at a predetermined angle to a predetermined axis of the automobile, said installation including,
- a vehicle bay within which the automobile is positioned,
- a plane reflecting surface connected with the bay positioned externally of the automobile in perpendicular relation to the predetermined axis of the automobile,
- an alignment device intersected by an optical plane of the alignment device, said alignment device including
  - a nondirectional light source positioned in said optical plane for producing a brightness zone on the reflecting surface,
  - at least two, signal producing, light-detecting means positioned in said optical plane on opposite sides of said light source for viewing the brightness zone;
  - first and second barrier plates connected within said alignment device between said reflecting surface and said at least two, signal producing light detecting means and being disposed perpendicular to and on opposite sides of the optical plane to partially obscure said at least two, signal producing, light-detecting means by equal amounts to produce equal signals therein only when the optical plane is perpendicular to the plane of the reflecting surface,
- a support releasably connectable to the automobile component to be carried thereby; and
- pivotal connection means for connecting said device with said support to cause said optical plane of said device to be directed in generally perpendicular relation toward said reflecting surface, said pivotal connecting means enabling angular adjustment of said device relative to said support to position said optical plane of the device at a predetermined offset angle from perpendicular relation to said reflecting surface.

9. An installation as defined in claim 8 wherein, said device further includes
- audible signal means connected with said light detecting means for producing an audible signal except when the signals produced by said two light detecting means are equal.

10. An installation as defined in claim 8 wherein, said reflecting surface is connected with said bay in horizontal disposition with portions of said reflecting surface positioned adjacent the automobile component; and wherein said support includes
- securing means for releasable connection with the automobile component,
- a member fixedly connected with said securing means extending away from the automobile component toward said reflecting surface,
- a vertically and transversely extending flat mounting surface connected with said member;
and wherein said pivotal connection means includes,
- axle means disposed in the optical plane of said device extending between and connected with said device and said mounting surface, said axle means supporting said device on said mounting surface for angular motion about a pivotal axis disposed in said optical plane and perpendicular to said mounting surface.

11. An installation as defined in claim 8 wherein, said reflecting surface is connected with said bay in vertically extending disposition, portions of said reflecting surface being positioned adjacent the automobile component; and wherein said support includes,
- securing means for releasable connection with the automobile component,
- a member fixedly connected with said securing means extending away from the automobile component toward said reflecting surface,
- a horizontally and transversely extending flat mounting surface connected with said member;
and wherein said pivotal connection means includes,
- axle means disposed in the optical plane of said device extending between and connected with said device and said mounting surface, said axle means supporting said device on said mounting surface for angular motion about a pivotal axis disposed in said optical plane and perpendicular to said mounting surface.

12. An installation as defined in claim 11 further including,
- a second reflecting surface, said second reflecting surface being connected with said bay in horizontal disposition, portions of said second reflecting surface being positioned adjacent the automobile component;
- and wherein said mounting surface is rotatably connected with said member for rotation about a horizontal axis of said member to bring said mounting surface to a second position in which said mounting surface is disposed generally vertically; and
- releasable locking means for selectively locking said mounting surface to said member in each of the vertical and horizontally disposed positions thereof.

13. An installation as defined in claim 11 further including,
- locating means connected with said bay to engage the rear wheels of the automobile to locate the automobile with a front transverse suspension axis thereof perpendicular to said reflecting surface.

References Cited

UNITED STATES PATENTS

| | | | |
|---|---|---|---|
| 2,292,969 | 8/1942 | Peters | 33—46.2 |
| 2,623,927 | 12/1952 | Germans | 356—152 |
| 2,940,174 | 6/1960 | Shoemaker | 356—121 |
| 2,945,132 | 7/1960 | Schüch | 250—237 |
| 3,029,515 | 8/1962 | Marteil | 33—46.2 |
| 3,238,373 | 3/1966 | Orloff | 356—152 |
| 3,270,612 | 9/1966 | Collyer | 356—152 |
| 3,296,921 | 1/1967 | Polster | 356—152 |
| 3,395,287 | 7/1968 | Rajac | 356—152 |

FOREIGN PATENTS

| | | |
|---|---|---|
| 6,511,262 | 1966 | Netherlands. |

RONALD L. WIBERT, Primary Examiner

J. ROTHENBERG, Assistant Examiner

U.S. Cl. X.R.

33—46.2; 356—152, 155